(12) United States Patent
Nakano et al.

(10) Patent No.: US 11,794,636 B2
(45) Date of Patent: Oct. 24, 2023

(54) HEADLAMP AND HEADLAMP CONTROL SYSTEM

(71) Applicant: HONDA MOTOR CO., LTD., Tokyo (JP)

(72) Inventors: Ryuichi Nakano, Tokyo (JP); Naoto Inoue, Tokyo (JP); Masayoshi Takori, Wako (JP); Go Shimizu, Tokyo (JP); Taku Kuraishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,721

(22) Filed: Feb. 26, 2022

(65) Prior Publication Data
US 2022/0281379 A1 Sep. 8, 2022

(30) Foreign Application Priority Data
Mar. 3, 2021 (JP) ................. 2021-033787

(51) Int. Cl.
*B60Q 1/14* (2006.01)
*G06V 20/58* (2022.01)
*B60Q 1/00* (2006.01)

(52) U.S. Cl.
CPC ............ *B60Q 1/143* (2013.01); *G06V 20/58* (2022.01); *B60Q 1/0023* (2013.01); *B60Q 2300/42* (2013.01)

(58) Field of Classification Search
CPC . B60Q 1/04; B60Q 1/14; B60Q 1/143; B60Q 1/1423; B60Q 1/0023;
(Continued)

(56) References Cited

U.S. PATENT DOCUMENTS

2002/0089853 A1* 7/2002 Taniuchi ................. F21S 41/43
362/346
2003/0107323 A1 6/2003 Stam
(Continued)

FOREIGN PATENT DOCUMENTS

EP 3343095 A1 * 7/2018 ........... B60Q 1/0076
EP 3410004 A1 * 12/2018 ........... B60Q 1/1407
(Continued)

OTHER PUBLICATIONS

Office Action received in corresponding Japanese application No. 2021-033787 dated Oct. 18, 2022 with English translation (10 pages).

*Primary Examiner* — Abdullah A Riyami
*Assistant Examiner* — Syed M Kaiser
(74) *Attorney, Agent, or Firm* — Rankin, Hill & Clark LLP (57) ABSTRACT

A headlamp is configured to emit a low beam toward a forward direction of a vehicle. The headlamp is switchable between a first low beam distribution state and a second low beam distribution state. The headlamp is configured to, in the first low beam distribution state, illuminate a low area straight ahead of the vehicle, and in the second low beam distribution state, illuminate at least one of: a width-direction intermediate portion of the low area, one width-direction end portion of the low area, and the other width-direction end portion of the low area, even brighter than the first low beam distribution state.

8 Claims, 5 Drawing Sheets

(58) Field of Classification Search
CPC ........... B60Q 2300/42; B60Q 2300/112; F21S 41/04; F21S 41/675
See application file for complete search history.

(56) References Cited

U.S. PATENT DOCUMENTS

| | | | |
|---|---|---|---|
| 2003/0137849 A1* | 7/2003 | Alden | B60Q 1/085 |
| | | | 362/276 |
| 2014/0268850 A1* | 9/2014 | Marley | F21S 41/336 |
| | | | 362/516 |
| 2015/0070923 A1* | 3/2015 | Kadowaki | F21S 41/148 |
| | | | 362/517 |
| 2018/0038568 A1 | 2/2018 | Sawada | |
| 2020/0130563 A1* | 4/2020 | Sung | G06V 20/588 |
| 2021/0270440 A1* | 9/2021 | Kinoshita | F21S 41/255 |
| 2021/0387566 A1* | 12/2021 | Kanazawa | F21S 41/265 |
| 2022/0074562 A1* | 3/2022 | Servantie | F21S 41/141 |

FOREIGN PATENT DOCUMENTS

| | | | | |
|---|---|---|---|---|
| JP | 2009-007001 A | | 1/2009 | |
| JP | 2018-020683 A | | 2/2018 | |
| JP | 2018020683 A | * | 2/2018 | ............. B60Q 1/085 |
| JP | 2018-034758 A | | 3/2018 | |
| JP | 2018034758 A | * | 3/2018 | |
| JP | 2019121472 A | * | 7/2019 | ............... B60Q 1/04 |

* cited by examiner

HEADLAMP AND HEADLAMP CONTROL SYSTEM

CROSS-REFERENCE TO RELATED APPLICATIONS

The present application claims the foreign priority benefit under Title 35 U.S.C. § 119 of Japanese Patent Application No. 2021-033787, filed on Mar. 3, 2021, in the Japan Patent Office, the disclosure of which is herein incorporated by reference in its entirety.

BACKGROUND OF THE INVENTION

1. Field of the Invention

The present invention relates to a headlamp and a headlamp control system.

2. Description of Related Art

Headlamps of vehicles are controlled such that the amount of light is controlled in a manner depending on the surrounding environment. Japanese Patent Application Publication No. 2009-7001 (hereinafter referred to as Patent Literature 1) discloses reducing the amount of light of headlamps in urban areas to prevent glare from being seen by the driver of an opposing vehicle.

The technique disclosed in Patent Literature 1 is directed to reducing glare in a high beam area and to improving the visibility and is ineffective in reducing glare and improving the visibility in an urban area where high beam is not so frequently used (in other words, low beam is frequently used).

SUMMARY

The present invention has been made in view of the above-described circumstance and it is an object of the present invention to provide a headlamp and a headlamp control system which are capable of improving the visibility in a low beam distribution state with a simple configuration.

To achieve the above-described object, an embodiment according to the present invention provides a headlamp configured to emit a low beam toward a forward direction of a vehicle, wherein the headlamp is switchable between a first low beam distribution state and a second low beam distribution state, wherein the headlamp is configured to, in the first low beam distribution state, illuminate a low area straight ahead of the vehicle, and in the second low beam distribution state, illuminate at least one of: a width-direction intermediate portion of the low area, one width-direction end portion of the low area, and the other width-direction end portion of the low area, even brighter than the first low beam distribution state.

The present invention makes it possible to improve the visibility in a low beam mode frequently used in urban areas or the like, by controlling the amount of the low beam in a manner depending on directions.

DETAILED DESCRIPTION OF THE EMBODIMENTS

Embodiments of the present invention will be described in detail below with reference to the drawings as appropriate. Note that, basically, constituent elements having the same function are denoted by the same reference sign and duplicated description will be omitted. The terms representing directions, such as up-down, front-rear, left-right (vehicle-width direction), are defined with respect to a passenger (driver) of the vehicle.

First Embodiment

Figure 1:
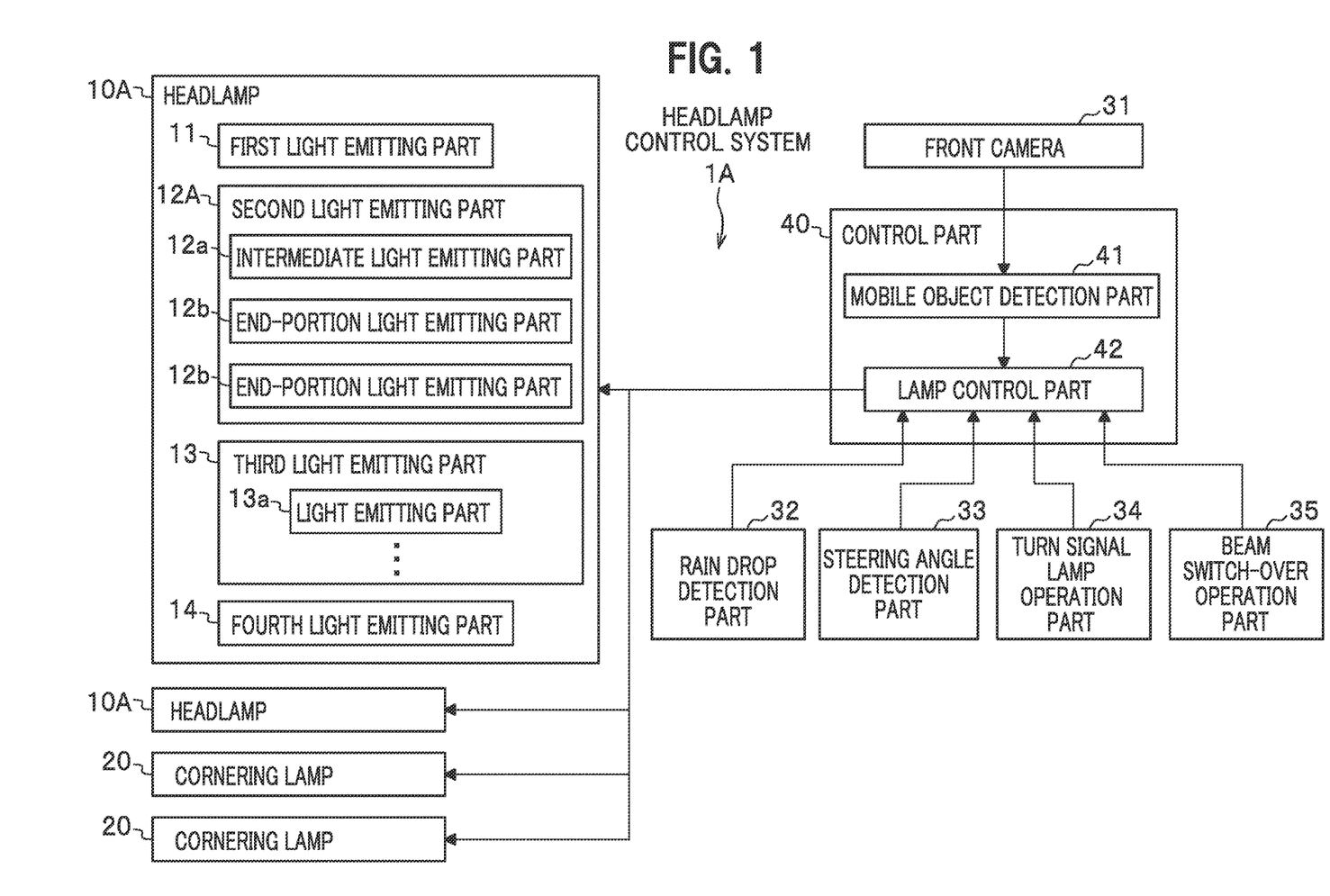
FIG. 1 is a block diagram schematically illustrating a headlamp control system of a first embodiment according to the present invention.

As illustrated in FIG. 1, a headlamp control system 1A of a first embodiment according to the present invention includes: a left-right pair of headlamps 10A; a left-right pair of cornering lamps 20; a front camera 31; a rain drop detection part 32; a steering angle detection part 33; a turn signal lamp operation part 34; a beam switch-over operation part 35; and a control part 40.

<Headlamp>

The headlamps 10A are controlled by the control part 40 according to operations or the like of the driver, to emit light toward the forward direction of the vehicle C1. Each of the headlamps 10A is of the multi-eye type that includes a plurality of light emitting parts. Each of the plurality of light emitting parts includes a light emitting diode(s) (LED) and an optical surface such as a reflection plate disposed to cover the LED of the light emitting part from the rear thereof and to partition off the light emitting parts. The headlamps 10A each include: a first light emitting part 11 and a second light emitting part 12A, each serving as a low beam emitting part; and a third light emitting part 13 and a fourth light emitting part 14, each serving as a high beam emitting part.

<<First Light Emitting Part>>

The first light emitting part 11 is a first low beam emitting part configured to emit light toward the forward direction of the vehicle C1 to an area (see illumination area A1 illustrated in FIGS. 2 and 3) whose width is relatively narrow. The first light emitting part 11 is configured to direct light emitted from the LED(s) to the illumination area A1, located under the parallel line, by the optical surfaces. Note that in FIG. 3, the vertical axis corresponds to the up-down directions and the horizontal axis corresponds to the left-right directions (vehicle-width directions). The parallel line HL corresponds to a virtual plane extending through the headlamps 10A in parallel to the road surface.

<<Second Light Emitting Part>>

Figure 2:
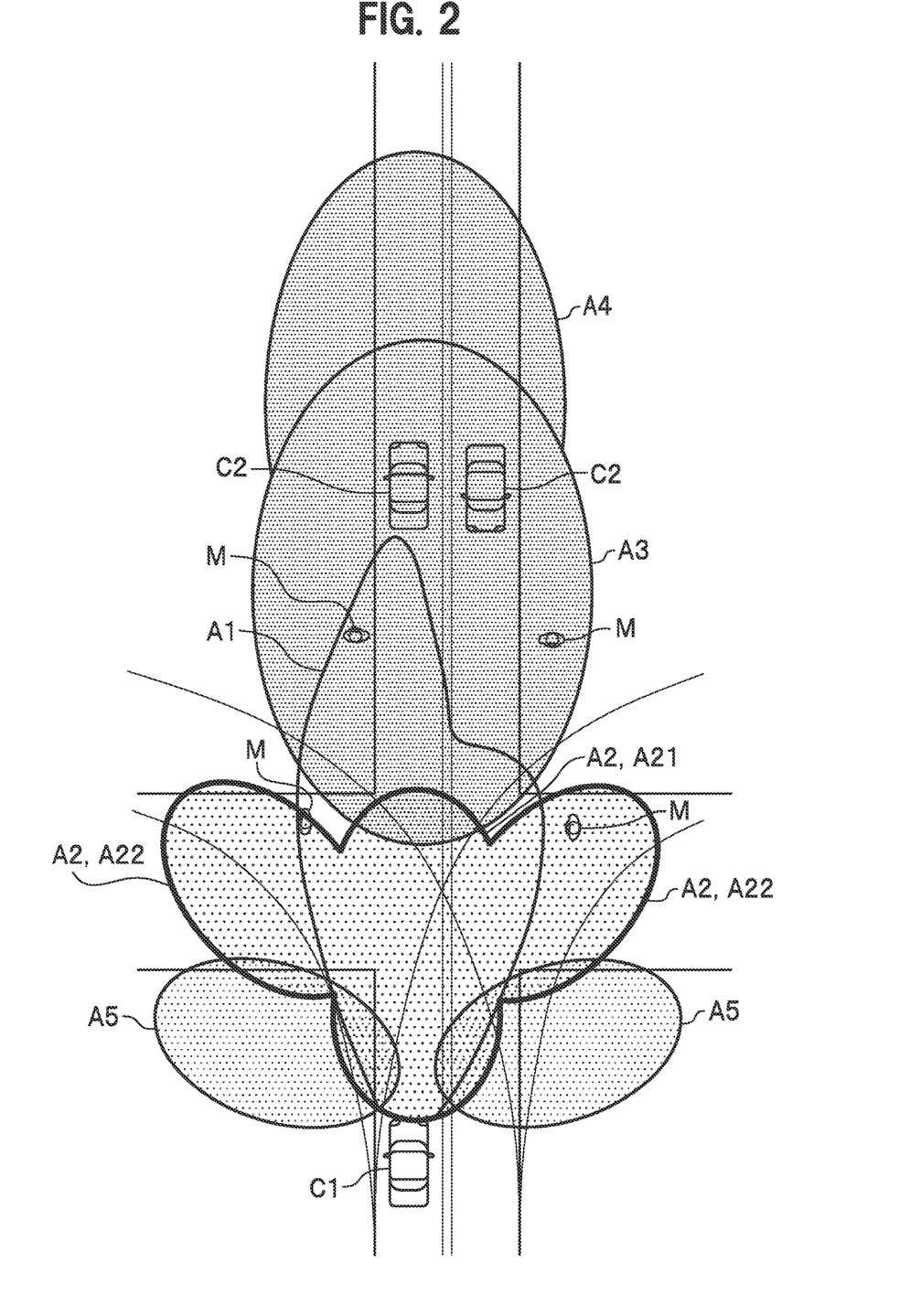
FIG. 2 is a diagram schematically illustrating an example of illumination areas illuminated by the headlamps of a vehicle to which the headlamp control system of the first embodiment according to the present invention is applied.
Figure 3:
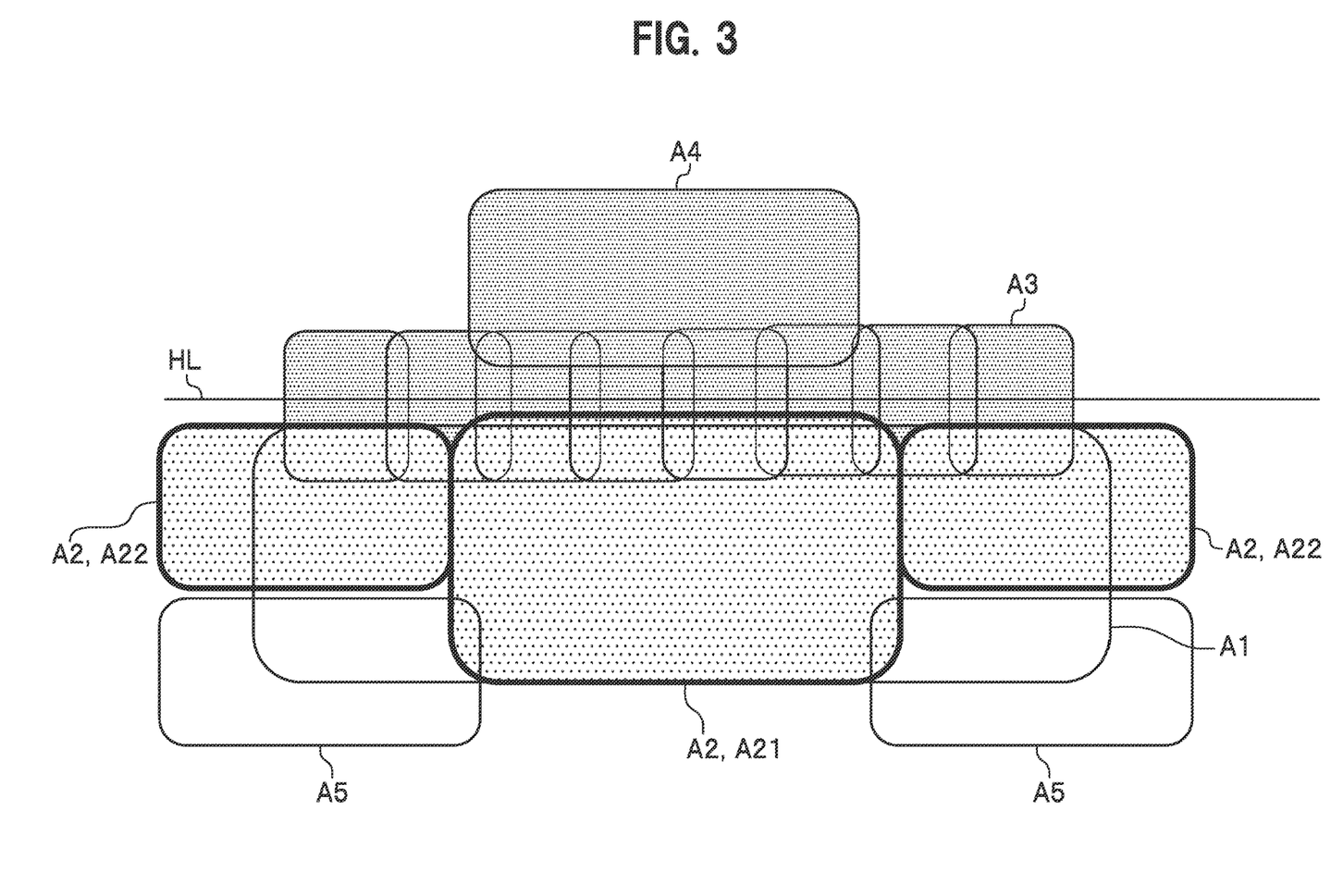
FIG. 3 is another diagram schematically illustrating an example of illumination areas illuminated by the headlamps of the vehicle to which the headlamp control system of the first embodiment according to the present invention is applied.

The second light emitting part 12A is a second low beam emitting part configured to emit light toward the forward direction of the vehicle C1 to an area (see illumination area (second area) A2 illustrated in FIGS. 2 and 3) whose width in the vehicle-width directions is wide compared to the first light emitting part 11. The second area A2 includes the first area A1 and has a wider width in the vehicle-width directions than the first area. The second light emitting part 12 is configured to direct light emitted from LEDs to the illumination area A2, located under the parallel line HL, by the optical surfaces.

The second light emitting part 12A includes an intermediate light emitting part 12a and a left-right pair of end portion light emitting parts 12b. The intermediate light emitting part 12a is configured to emit light to a width-direction intermediate portion A21 of the illumination area A2. The width-direction intermediate portion A21 is positioned to overlap with a width-direction intermediate portion of the illumination area A1. The end portion light emitting parts 12b are configured to emit light respectively to width-direction end portions A22 of the illumination area A2. The width-direction end portions A22 overlap with upper portions of width-direction end portions of the illumination area A1 and each extend further than the illumination area A1 outward in the corresponding width direction. As described, the illumination area A1 illuminated by the first light emitting part 11 is divided into three areas in the width direction (width-direction intermediate portion and the pair of width-direction end portions). The intermediate light emitting part 12a serves to increase the amount of light in the width-direction intermediate portion of the illumination area A1; and the end portion light emitting parts 12b serve to increase the amount of light in the width-direction end portions of the illumination area A1.

<<Third Light Emitting Part>>

The third light emitting part 13 is a first high beam emitting part configured to emit light toward the forward direction of the vehicle C1 mainly to an area above the parallel line HL. More specifically, the headlamp 10A turns on the third light emitting part 13 to emit light as a high beam to an area which includes the vicinity of the parallel line HL. See the illumination area (third area) A3 illustrated in FIGS. 2 and 3. The third light emitting part 13 includes a plurality of light emitting parts 13a. Each of the plurality of light emitting parts 13a emits light to, of the third area A3, one of segmented areas into which the third area A3 is segmented in the left-right direction. In other words, the third area A3 is segmented into a plurality of segments in the left-right direction; and the plurality of light emitting parts 13a are arrayed in the left-right direction. The plurality of light emitting parts 13a each correspond to one of the areas into which the third area A3 is segmented in the left-right direction.

The fourth light emitting part 14 is a second high beam emitting part configured to emit light toward the forward direction of the vehicle C1 to an area above the parallel line HL. Specifically, the headlamp 10A turns on the fourth light emitting part 14 to emit light as a high beam to illuminate an illumination area (fourth area) A4, illustrated in FIGS. 2 and 3, above the parallel line HL. In other words, the fourth area A4 is set at a higher position than the third area A3, i.e., set far from the vehicle C1 than the third area A3.

<Cornering Lamp>

The cornering lamps 20 are each a light emitting part configured to emit light to an area located in a diagonally forward direction of the vehicle C1. See illumination areas (fifth areas) A5 illustrated in FIGS. 2 and 3. The fifth areas A5 each overlap with a lower portion of a corresponding width-direction end portion of the illumination area A1 and extend further than the illumination area A1 outward in the corresponding width direction and downward (i.e., toward the vicinity of the vehicle C1).

<Front Camera>

As illustrated in FIG. 2, the front camera (e.g., stereo camera) 31 captures an image of the view ahead of the vehicle C1 and outputs the image capture result to the control part 40. The front camera 31 is a part of a mobile object detection part configured to detect mobile objects M present ahead of the vehicle C1. As the front camera 31 serving as a part of the mobile object detection part, a camera other than stereo cameras may be used.

<Rain Drop Detection Part>

The rain drop detection part 32 is a sensor configured to detect rain drops dropped on the front windshield or the like of the vehicle C1 and to output the detection result to the control part 40.

<Steering Angle Detection Part>

The steering angle detection part 33 is a sensor configured to detect a steering wheel angle of the vehicle C1 or a turning angle of the turning wheels of the vehicle C1 and to output the detection result to the control part 40.

<Turn Signal Lamp Operation Part>

The turn signal lamp operation part 34 allows the driver to operate turn signal lamps of the vehicle C1 and is configured to output information indicative of the operation of the driver to the control part 40.

<Beam Switch Operation Part>

The beam switch-over operation part 35 allows the driver to operate to switch between low beam and high beam of the headlamps 10A and is configured to output information indicative of the operation of the driver to the control part 40.

<Control Part>

The control part 40 is a so-called electrical control unit (ECU) including a central processing unit (CPU), a read-only memory (ROM), and a random access memory (RAM). The control part 40 includes a mobile object detection part 41 and a lamp control part 42, as functional parts.

<<Mobile Object Detection Part>>

The mobile object detection part 41 is configured to receive the image capture result of the front camera 31 and detect (extract) mobile objects M (opposing vehicles C2, bicycles, pedestrians, and the like) from the received image capture result. The mobile object detection part 41 outputs the detection (extraction) result to the lamp control part 42. In addition, the mobile object detection part 41 measures (calculates) the distances from the vehicle C1 to the detected mobile objects M and relative positions (directions) of the detected mobile objects M with respect to the vehicle C1, based on the image capture result of the front camera 31, and outputs the measurement result to the lamp control part 42. Note that the mobile object detection part 41 is not limited to one extracting mobile objects M from the image capture result of the front camera 31. For example, the mobile object detection part 41 may be configured to detect mobile objects M (opposing vehicles C2) on the basis of a detection result of a radar emitting ultrasonic waves in the forward direction of the vehicle C1 and detecting reflected waves thereof or on the basis of a communication result of communication means that communicates positional information on the opposing vehicles C2. Further, the mobile object detection part 41 may be configured to detect mobile objects M by obtaining positional information on mobile terminals carried by the pedestrians. The mobile object detection part 41 may be configured to measure the distances from the vehicle C1 to the mobile objects M on the basis of the detection result (emission time and reception time) of the radar. The mobile object detection part 41 may be configured to detect mobile objects M and detect the distances to the mobile objects M by obtaining a detection result of a sensor detecting the mobile objects M and a detection result of a separate sensor detecting the distances to the mobile objects M.

The mobile object detection part 41 may be configured to determine whether a mobile object M is a human (pedestrian or human riding a bicycle) by using a contour extraction technique, face recognition technique, or the like. In this case, the lamp control part 42 may be configured to perform below-described control when the mobile object M is a human.

<<Lamp Control Part>>

The lamp control part 42 is configured to control the headlamps 10A and the cornering lamps 20. The lamp control part 42 turns on or off the headlamps 10A and the cornering lamps 20 according to operations or the like of the driver. The lamp control part 42 switches between low beam and high beam of the headlamps 10A according to the driver's operations on the beam switch-over operation part 35. Specifically, when low beam is selected, the lamp control part 42 turns on the first light emitting part 11 and as needed the second light emitting part 12A and turns off the third light emitting part 13 and the fourth light emitting part 14; and when high beam is selected, the lamp control part 42 turns on the third light emitting part 13 and as needed the fourth light emitting part 14 and turns off the first light emitting part 11 and the second light emitting part 12A.

<Low Beam Distribution State>

The lamp control part 42 produces low beam distribution states by controlling turning on and off of the first light emitting part 11 and the second light emitting part 12A. In the low beam distribution states, the third light emitting part 13, the fourth light emitting part 14, and the cornering lamps 20 are each kept in a state of being off. The lamp control part 42 is configured to, in the low beam distribution states, always put the first light emitting part 11 in a state of being on and, as necessary, put the second light emitting part 12A in a state of being on. In addition, the lamp control part 42 may put the cornering lamps 20 in a state of being on in a low beam distribution state.

<<First Low Beam Distribution State>>

The lamp control part 42 produces a first low beam distribution state by turning on the first light emitting part 11. In this state, the second light emitting part 12A is kept in a state of being off. In this case, the illumination area (low area) A1, which is of the basic light distribution of low beam, is illuminated (see FIGS. 2 and 3).

<<Second Low Beam Distribution State>>

The lamp control part 42 produces a second low beam distribution state by turning on the first light emitting part 11 and at least one of the light emitting parts 12a, 12b, 12b of the second light emitting part 12A. In this state, the other(s) of the light emitting parts 12a, 12b, 12b of the second light emitting part 12A are kept in a state of being off.

When the intermediate light emitting part 12a is turned on, the illumination area A21 overlapping with a left-right direction intermediate portion of the illumination area A1 is illuminated, and thus the width-direction intermediate portion of the illumination area A1 is illuminated even brighter (see FIGS. 2 and 3).

When either of the end portion light emitting parts 12b is turned on, a corresponding illumination area A22 overlapping with a corresponding left-right direction end portion of the illumination area A1 is illuminated, and thus a corresponding width-direction end portion of the illumination area A1 is illuminated even brighter (see FIGS. 2 and 3)

Moreover, when either of the end portion light emitting parts 12b is turned on, the corresponding illumination area A22 extending further than the illumination area A1 outward in the corresponding width direction is illuminated, and thus an area extending further in the corresponding width direction is illuminated (see FIGS. 2 and 3).

Still further, when either of the cornering lamps 20 is turned on, the illumination area A5 extending further than the illumination area A1 outward in the corresponding width direction and downward is illuminated, and as a result, an area extending further than the illumination area A1 outward in the corresponding width direction and downward is illuminated (see FIGS. 2 and 3).

<Control According to External Situation>

Subsequently, a description will be given of a method of controlling the first light emitting part 11 and the second light emitting part 12A by the lamp control part 42 in a manner depending on an external situation. In a normal situation (fine weather and no human detected), the lamp control part 42 produces a first low beam distribution state in which the lamp control part 42 puts the first light emitting part 11 in a state of being on and puts the second light emitting part 12A in a state of being off.

<<Control in Bad Weather>>

In bad weather such as rain or snow, when rain drops are detected by the rain drop detection part 32, which is an example of bad weather detection part in this embodiment, the lamp control part 42 produces a second low beam distribution state in which the lamp control part 42 puts the first light emitting part 11 and the intermediate light emitting part 12a of the second light emitting part 12A in a state of being on and puts the end portion light emitting parts 12b of the second light emitting part 12A in a state of being off. Similarly, when bad weather is detected based on a result of detection by a not-shown bad weather detection part configured to detect bad weather such as fog of the like, the lamp control part 42 produces a second low beam distribution state in which the lamp control part 42 puts the first light emitting part 11 and the intermediate light emitting part 12a of the second light emitting part 12A in a state of being on and puts the end portion light emitting parts 12b of the second light emitting part 12A in a state of being off. In this way, a road surface that is difficult to see due to bad weather is illuminated even brighter, and as a result, a clear field of view of the driver is ensured.

<<Control in the Event of Detection of Mobile Object>>

The lamp control part 42 is configured to, when a mobile object M (e.g., a human) is present ahead of the vehicle C1 and, in the case of the embodiment, the mobile object detection part 41 detects that human, turn on the first light emitting part 11, turn on, of the light emitting parts 12a, 12b, 12b of the second light emitting part 12A, one that corresponds to the direction in which the human is present, and turn off the others of the light emitting parts 12a, 12b, 12b. In this way, the driver is made to easily recognize the mobile object M and the mobile object M (e.g., human) is made to easily recognize the vehicle C1.

<Control Method Based on Operation Situation>

Subsequently, a description will be given of a control method based on a situation of the lamp control part 42 performing operations on the first light emitting part 11, the second light emitting part 12A, and the cornering lamps 20. In a normal situation, the lamp control part 42 produces a first low beam distribution state in which the lamp control part 42 puts the first light emitting part 11 in a state of being on and puts the second light emitting part 12A and the cornering lamps 20 in a state of being off <<Control Method in the Event of Steering Operation>>

The lamp control part 42 is configured to, when the steering wheel is operated and, in the case of the embodiment, when the steering angle detection part 33 detects a certain steering angle, turn on the first light emitting part 11, turn on, of the end portion light emitting parts 12*b*, 12*b* of the second light emitting part 12A and the cornering lamps 20, those that correspond to the steering angle (e.g., in a left curb, the left end portion light emitting part 12*b* and the left cornering lamp 20), and turns off the intermediate light emitting part 12*a* and the other of the end portion light emitting parts 12*b*, 12*b* of the second light emitting part 12A and the other of the cornering lamps 20 (e.g., in a left curb, the right end portion light emitting part 12*b* and the right cornering lamp 20) In this way, the driver's field of view in the advancing direction is secured.

The lamp control part 42 may be configured to, when the steering angle is less than a predetermined value, turn on, of the end portion light emitting parts 12*b*, 12*b*, one that correspond to the steering angle, and when the steering angle is greater than or equal to the predetermined value, turn on, of the end portion light emitting parts 12*b*, 12*b*, one that correspond to the steering angle and turn on, of the cornering lamps 20, one that corresponds to the steering angle. Moreover, the lamp control part 42 may be configured to: inhibit turning on the cornering lamps 20 when the vehicle speed detected by a vehicle speed sensor or the like is greater than or equal to a predetermined value; and allow turning on the cornering lamps 20 when the vehicle speed detected by a vehicle speed sensor or the like is less than the predetermined value.

<<Control Method in the Event of Turn Signal Lamp Operation>>

The lamp control part 42 may be configured to, when the turn signal lamps are operated, in the case of the embodiment when the turn signal lamp operation part 34 is operated, turn on the first light emitting part 11 and turn on, of the end portion light emitting parts 12*b*, 12*b* of the second light emitting part 12A and the cornering lamps 20, those that correspond to the indicated direction, and turns off the intermediate light emitting part 12*a* and the other of the end portion light emitting parts 12*b*, 12*b* and the other of the cornering lamps 20. In this way, the driver's field of view in the advancing direction is secured.

A headlamp 10A of a first embodiment according to the present invention is configured to emit a low beam toward a forward direction of a vehicle C1. The headlamp 10A is switchable between a first low beam distribution state and a second low beam distribution state. The headlamp 10A is configured to, in the first low beam distribution state, illuminate a low area (illumination area A1) straight ahead of the vehicle C1, and in the second low beam distribution state, illuminate at least one of: a width-direction intermediate portion of the low area, one width-direction end portion of the low area, and the other width-direction end portion of the low area, even brighter than the first low beam distribution state.

Therefore, the headlamp 10A is capable of increasing the amount of low beam in each advancing direction of the vehicle C1 in the second low beam distribution state, which improves the visibility in the low beam mode frequently used in urban areas.

Moreover, as the headlamp 10A increase the amount of a low beam in a direction to which attention of the driver is to be paid, the visibility in the low beam mode is improved and at the same time, power consumption and the like is suppressed by maintaining the amount of the low beams in the other directions.

The headlamp 10A is configured to, in the second low beam distribution state, when illuminating at least one of the one width-direction end portion and the other width-direction end portion even brighter than the first low beam distribution state, illuminate an area extending further than a side of the low area outward in a width direction corresponding to the at least one of the one width-direction end portion and the other width-direction end portion.

Therefore, in the second low beam distribution state, the headlamp 10A extends the light illumination area outward in width directions of the vehicle C1, leading to an improvement in the visibility in the low beam mode.

A headlamp control system 1A of the first embodiment according to the present invention includes: the headlamp 10A; and a control part 40 configured to control the headlamp 10A. The control part 40 controls the headlamp 10A in a manner depending on an external situation of the vehicle C1.

The headlamp control system 1A is capable of improving the visibility in the low beam mode in a manner depending on an external situation of the vehicle C1, for example, by switching between the first low beam distribution state and the second low beam distribution state and by setting the direction in which the amount of light is increased in the second low beam distribution state.

The control part 40 of the headlamp control system 1A may be configured to, in bad weather, control the headlamp 10A to illuminate the width-direction intermediate portion in the second low beam distribution state even brighter than the first low beam distribution state.

Therefore, the headlamp control system 1A can improve the visual ability of the driver in rain weather.

The control part 40 of the headlamp control system 1A may be configured to, when a mobile object M is present ahead of the vehicle C1, control the headlamp 10A to illuminate, in the second low beam distribution state, of the width-direction intermediate portion, the one width-direction end portion, and the other width-direction end portion, one that corresponds to the direction in which the mobile object M is present, even brighter than the first low beam distribution state.

Therefore, the headlamp control system 1A can improve the visual ability of the driver in the direction in which the mobile object M is present.

A headlamp control system 1A of a certain embodiment according to the present invention includes: the headlamp 10A; and a control part 40 configured to control the headlamp 10A. The control part 40 controls the headlamp 10A in a manner depending on an operation situation of the vehicle C1.

The headlamp control system 1A is capable of improving the visibility in the low beam mode in a manner depending on an operation situation of the vehicle C1, for example, by switching between the first low beam distribution state and the second low beam distribution state and by setting the direction in which the amount of light is increased in the second low beam distribution state.

The control part 40 of the headlamp control system 1A may be configured to, when an operation is performed on the steering wheel or on the turn signal lamps, in the second low beam distribution state, control the headlamp 10A to illuminate, of the one width-direction end portion and the other width-direction end portion, one that corresponds to the operation even brighter than the first low beam distribution state.

Therefore, the headlamp control system 1A is capable of improving the visibility of the low beam by increasing the amount of light of the low beam in the advancing direction of the vehicle C1.

The headlamp control system 1A may further include cornering lamps 20 each configured to illuminate a corresponding one of left-right cornering areas of the vehicle C1. The headlamp 10A may be further configured to, in the second low beam distribution state, when illuminating at least one of the one width-direction end portion of the low area and the other width-direction end portion of the low area even brighter than the first low beam distribution state, illuminate an area extending further than a side of the low area outward in a width direction corresponding to the at least one of the one width-direction end portion of the low area and the other width-direction end portion of the low area, thereby to illuminate an area ahead of a corresponding one of the cornering areas. The control part 40 may be further configured to, when an operation on a steering wheel or on the turn signal lamps is performed, control the headlamp 10A to illuminate, of the left and right cornering areas, one that corresponds to the operation and to illuminate, in the second low beam distribution state, of the one width-direction end portion and the other width-direction end portion, one that corresponds to the operation further than the first low beam distribution state outward in a corresponding width direction.

Therefore, the headlamp control system 1A is capable of improving the visibility in the low beam mode by extending the illumination area of the low beam in the advancing direction of the vehicle C1 using the cornering lamps 20.

Second Embodiment

Figure 4:
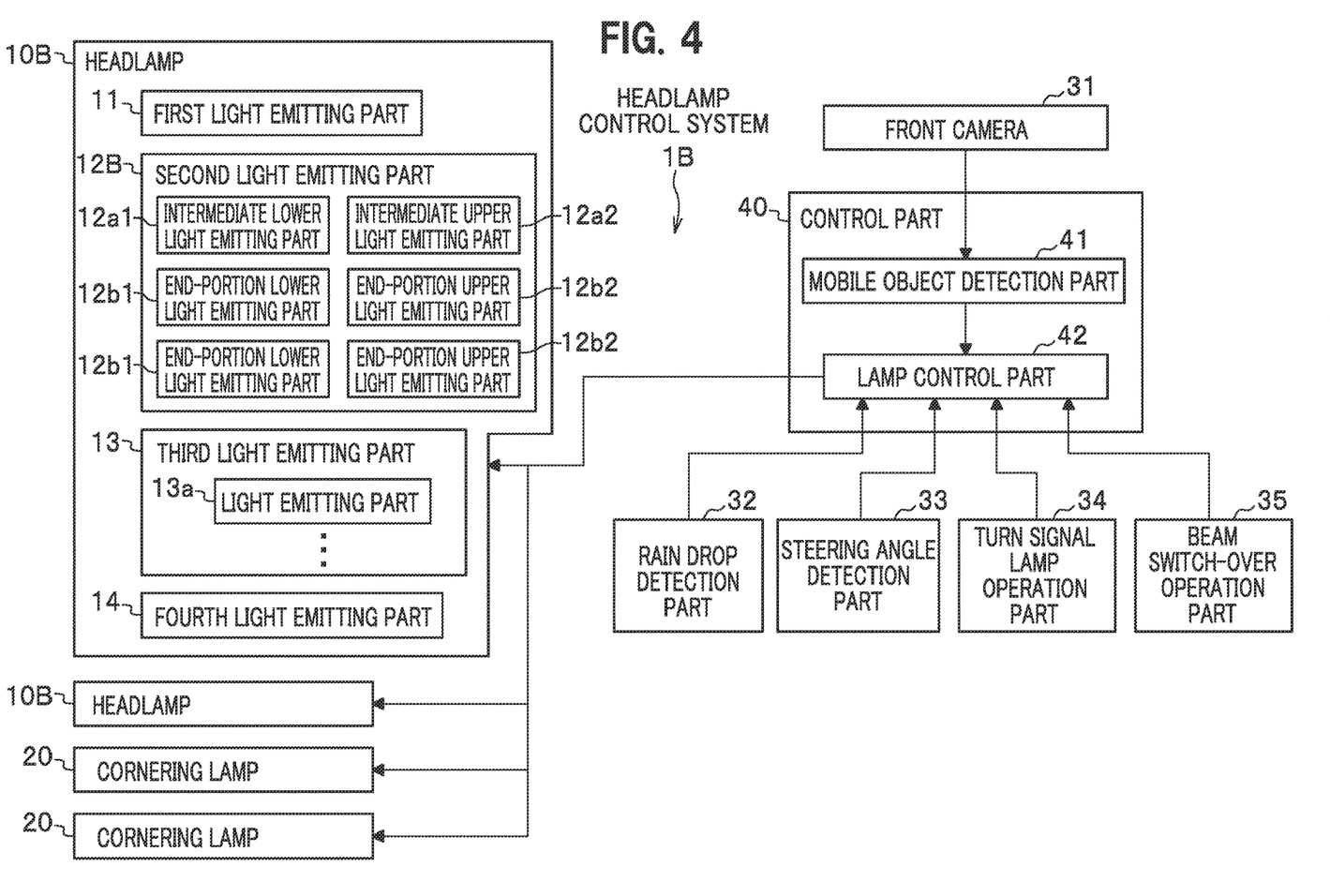
FIG. 4 is a block diagram schematically illustrating a headlamp control system of a second embodiment according to the present invention.

Subsequently, a description will be given of a headlamp control system of a second embodiment according to the present invention, mainly focusing the difference from the headlamp control system 1A of the first embodiment according to the present invention. As illustrated in FIG. 4, a headlamp control system 1B of the second embodiment according to the present invention includes headlamps 10B in place of the headlamps 10A. The headlamps 10B each includes a second light emitting part 12B in place of the second light emitting part 12A.

Figure 5:
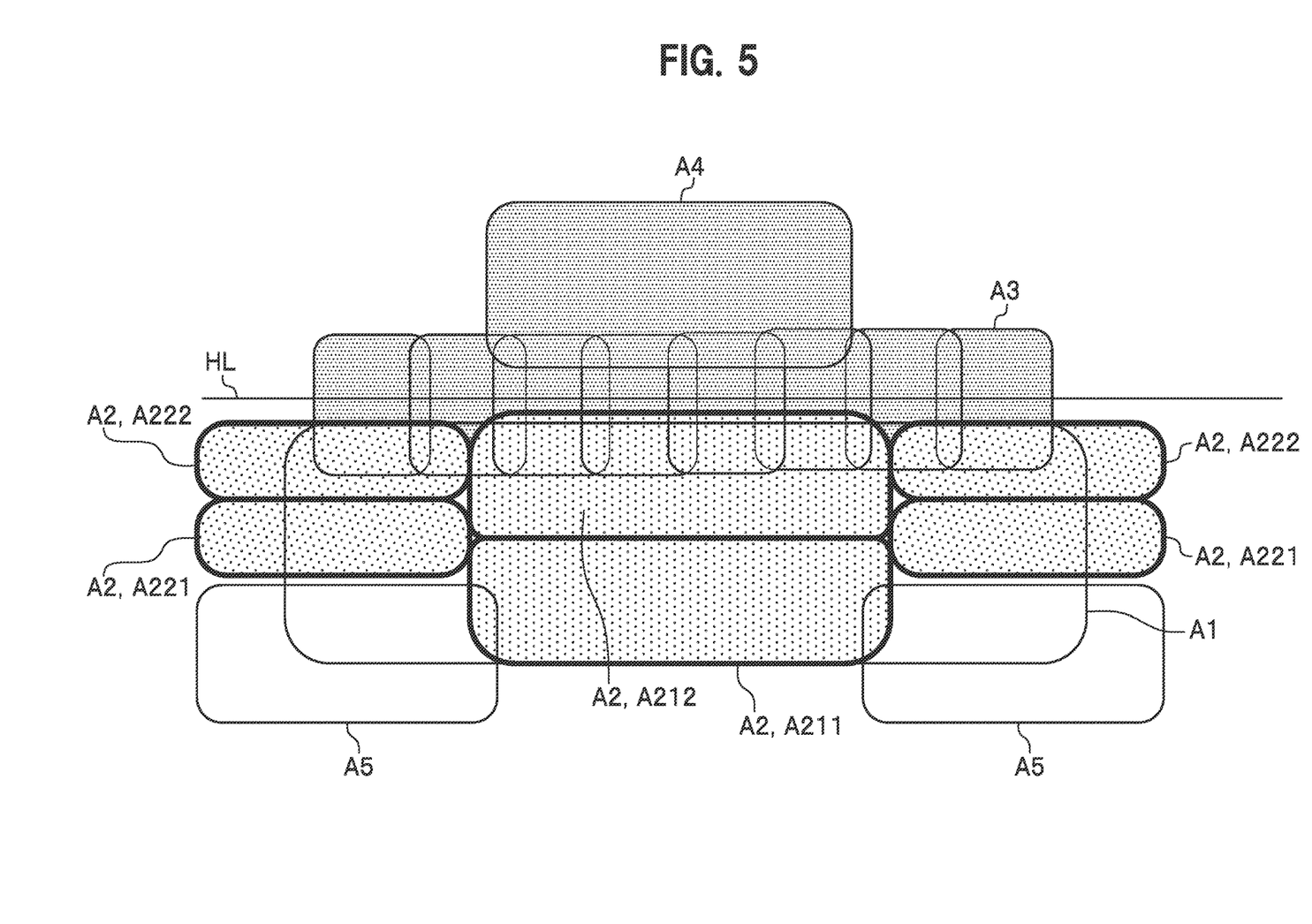
FIG. 5 is a diagram schematically illustrating an example of illumination areas illuminated by the headlamps of a vehicle to which the headlamp control system of the second embodiment according to the present invention is applied.

The second light emitting part 12B includes an intermediate lower light emitting part 12a1 and an intermediate upper light emitting part 12a2, in place of the intermediate light emitting part 12a. The intermediate lower light emitting part 12a1 is configured to emit light to an area A211 located in a lower portion of the width-direction intermediate portion A21 (for example, lower half of A21, i.e., an area in the vicinity of the vehicle C1) (see FIG. 5). The intermediate upper light emitting part 12a2 is configured to emit light to an area A212 located in an upper portion of the width-direction intermediate portion A21 (for example, upper half of A21, i.e., an area far from the vehicle C1) (see FIG. 5).

The second light emitting part 12B includes end portion lower light emitting parts 12b1 and end portion upper light emitting parts 12b2, in place of the end portion light emitting parts 12b. Each of the end portion lower light emitting parts 12b1 is configured to emit light to an area A221 located in a lower portion of a corresponding one of the width-direction end portions A22 (for example, lower half of A22, i.e., an area in the vicinity of the vehicle C1) (see FIG. 5). Each of the end portion upper light emitting parts 12b2 is configured to emit light to an area A222 located in an upper portion of a corresponding one of the width-direction end portions A22 (for example, upper half of A22, i.e., an area far from the vehicle C1) (see FIG. 5).

The lamp control part 42 is configured to control turning on/off of the intermediate lower light emitting part 12a1, intermediate upper light emitting part 12a2, end portion lower light emitting parts 12b1, and end portion upper light emitting parts 12b2, in a manner similar to the method of controlling the intermediate light emitting part 12a and end portion light emitting parts 12b. The lamp control part 42 is configured to, in the same condition as that to turn on the intermediate light emitting part 12a: turn on the intermediate lower light emitting part 12a1 and turn off the intermediate upper light emitting part 12a2 when the vehicle speed of the vehicle C1 is low (a speed less than a predetermined speed); and turn on both the intermediate lower light emitting part 12a1 and the intermediate upper light emitting part 12a2 when the vehicle speed of the vehicle C1 is high (a speed greater than or equal to the predetermined speed). Similarly, the lamp control part 42 is configured to, in the same condition as that to turn on one of the end portion light emitting parts 12b: turn on the corresponding end portion lower light emitting part 12b1 and turn off the corresponding end portion upper light emitting part 12b2 when the vehicle speed of the vehicle C1 is low (a speed less than a predetermined speed); and turn on both the corresponding end portion lower light emitting part 12b1 and the corresponding end portion upper light emitting part 12b2 when the vehicle speed of the vehicle C1 is high (a speed greater than or equal to the predetermined speed).

The headlamp 10B and the headlamp control system 1B of the second embodiment according to the present invention illuminate only a lower portion of the low area bright as necessary when the vehicle C1 is traveling at a low speed, facilitating reduction of power consumption and drawing attention of the driver to the low area.

Although certain embodiments of the present invention have been described above, it is to be understood that the present invention is not limited only to the above-described embodiments and the embodiments of the present invention can be modified as appropriate within the range not departing from the gist of the invention. For example, the headlamp may include a light emitting part configured to illuminate a width-direction intermediate portion of the illumination area A1; and a pair of light emitting parts configured to emit light to width-direction opposite end portions of the illumination area A1, and a control part may be configured to control the amount of light of each light emitting part to produce the first low beam distribution state and the second low beam distribution state. Moreover, the lamp control part may be configured to, in the control method for rain weather, produce the second low beam distribution state when a wiper is in operation in response to an operation to a wiper operation part configured to operate the wiper and/or when weather information received from a car navigation system or the like indicates a bad weather (e.g., rain, snow, dense fog).

What is claimed is:

1. A headlamp control system comprising:
   a headlamp configured to emit a low beam toward a forward direction of a vehicle;
   cornering lamps each configured to illuminate a corresponding one of left and right cornering areas of the vehicle; and a control part configured to control the headlamp,
wherein
the control part controls the headlamp in a manner depending on an operation situation of the vehicle,
the headlamp is switchable between a first low beam distribution state and a second low beam distribution state,
the headlamp is configured to, in the first low beam distribution state, illuminate a low area straight ahead of the vehicle, and in the second low beam distribution state, illuminate at least one of: a width-direction intermediate portion of the low area, one width-direction end portion of the low area, and the other width-direction end portion of the low area, even brighter than the first low beam distribution state,
the headlamp is further configured to, in the second low beam distribution state, when illuminating at least one of the one width-direction end portion of the low area and the other width-direction end portion of the low area even brighter than the first low beam distribution state, illuminate an area extending further than a side of the low area outward in a width direction corresponding to the at least one of the one width-direction end portion of the low area and the other width-direction end portion of the low area, thereby to illuminate an area ahead of a corresponding one of the cornering areas, and
the control part is further configured to, when an operation on a steering wheel or on turn signal lamps is performed, control the headlamp to illuminate, of the left and right cornering areas, one that corresponds to the operation and to illuminate, in the second low beam distribution state, of the one width-direction end portion and the other width-direction end portion, one that corresponds to the operation further than the first low beam distribution state outward in a corresponding width direction.

2. The A headlamp control system comprising:
a headlamp configured to emit a low beam toward a forward direction of a vehicle;
cornering lamps each configured to illuminate a corresponding one of left and right cornering areas of the vehicle; and
a control part configured to control the headlamp,
wherein
the control part controls the headlamp in a manner depending on an operation situation of the vehicle,
the headlamp is switchable between a first low beam distribution state and a second low beam distribution state,
the headlamp is configured to, in the first low beam distribution state, illuminate a low area straight ahead of the vehicle, and in the second low beam distribution state, illuminate at least one of: a width-direction intermediate portion of the low area, one width-direction end portion of the low area, and the other width-direction end portion of the low area, even brighter than the first low beam distribution state,
the headlamp is further configured to, in the second low beam distribution state, when illuminating at least one of the one width-direction end portion and the other width-direction end portion even brighter than the first low beam distribution state, illuminate an area extending further than a side of the low area outward in a width direction corresponding to the at least one of the one width-direction end portion and the other width-direction end portion,
the headlamp is further configured to, in the second low beam distribution state, when illuminating at least one of the one width-direction end portion of the low area and the other width-direction end portion of the low area even brighter than the first low beam distribution state, illuminate an area extending further than a side of the low area outward in a width direction corresponding to the at least one of the one width-direction end portion of the low area and the other width-direction end portion of the low area, thereby to illuminate an area ahead of a corresponding one of the cornering areas, and
the control part is further configured to, when an operation on a steering wheel or on turn signal lamps is performed, control the headlamp to illuminate, of the left and right cornering areas, one that corresponds to the operation and to illuminate, in the second low beam distribution state, of the one width-direction end portion and the other width-direction end portion, one that corresponds to the operation further than the first low beam distribution state outward in a corresponding width direction.

3. A headlamp control system comprising:
a headlamp configured to emit a low beam toward a forward direction of a vehicle;
cornering lamps each configured to illuminate a corresponding one of left and right cornering areas of the vehicle; and
a control part configured to control the headlamp and the cornering lamps,
wherein
the headlamp comprises:
    a first low beam emitting part configured to emit light toward a forward direction of the vehicle to illuminate a low area straight ahead of the vehicle; and
    a second low beam emitting part configured to emit light to at least one of: a width-direction intermediate portion of the low area, one width-direction end portion of the low area, and the other width-direction end portion of the low area,
the control part is capable of switching between a first low beam distribution state and a second low beam distribution state by controlling the headlamp,
in the first low beam distribution state, the control part controls the headlamp to illuminate the low area by turning on the first low beam emitting part and turning off the second low beam emitting part, and
in the second low beam distribution state, the control part controls the headlamp to illuminate the low area by turning on the first low beam emitting part and illuminate the at least one of: the width-direction intermediate portion, the one width-direction end portion, and the other width-direction end portion even brighter than the first low beam distribution state by turning on the second low beam emitting part, and
turns on either of the cornering lamps to illuminate an illumination area extending further than the low area outward in a corresponding width direction and downward.

4. The headlamp control system according to claim 3, wherein the headlamp is further configured to, in the second low beam distribution state, when illuminating at least one of the one width-direction end portion and the other width-direction end portion even brighter than the first low beam distribution state, illuminate an area extending further than a side of the low area outward in a width direction corresponding to the at least one of the one width-direction end portion and the other width-direction end portion.

5. The headlamp control system according to claim 3, wherein the headlamp is further configured to, in the second low beam distribution state, when illuminating at least one of the one width-direction end portion of the low area and the other width-direction end portion of the low area even brighter than the first low beam distribution state, illuminate an area above a corresponding one of the left and right cornering areas.

6. The headlamp control system according to claim 3, wherein the control part is further configured to, in bad weather, control the headlamp to illuminate the width-direction intermediate portion in the second low beam distribution state even brighter than the first low beam distribution state.

7. The headlamp control system according to claim 3, wherein the control part is further configured to, when a mobile object is present ahead of the vehicle, in the second low beam distribution state, control the headlamp to illuminate, of the width-direction intermediate portion, the one width-direction end portion, and the other width-direction end portion, one that corresponds to a direction in which the mobile object is present, even brighter than the first low beam distribution state.

8. The headlamp control system according to claim 3, wherein the control part is further configured to, when an operation is performed on a steering wheel or on turn signal lamps, in the second low beam distribution state, control the headlamp to illuminate, of the one width-direction end portion and the other width-direction end portion, one that corresponds to the operation even brighter than the first low beam distribution state.

\* \* \* \* \*